(12) United States Patent
McKenzie

(10) Patent No.: US 12,005,614 B2
(45) Date of Patent: Jun. 11, 2024

(54) METHOD OF MAKING PEN BODY RESIN RODS

(71) Applicant: Timothy McKenzie, Waxhaw, NC (US)

(72) Inventor: Timothy McKenzie, Waxhaw, NC (US)

(*) Notice: Subject to any disclaimer, the term of this patent is extended or adjusted under 35 U.S.C. 154(b) by 1418 days.

(21) Appl. No.: 16/258,615

(22) Filed: Jan. 27, 2019

(65) Prior Publication Data
US 2020/0061876 A1 Feb. 27, 2020

Related U.S. Application Data

(60) Provisional application No. 62/720,174, filed on Aug. 21, 2018.

(51) Int. Cl.
| | | |
|---|---|---|
| *B29C 39/00* | (2006.01) | |
| *B23K 5/00* | (2006.01) | |
| *B29B 7/00* | (2006.01) | |
| *B29B 7/90* | (2006.01) | |
| *B29C 39/12* | (2006.01) | |
| *B43K 5/00* | (2006.01) | |
| *B29K 63/00* | (2006.01) | |
| *B29K 67/00* | (2006.01) | |
| *B29K 75/00* | (2006.01) | |
| *B29K 105/16* | (2006.01) | |

(Continued)

(52) U.S. Cl.
CPC ............ *B29C 39/003* (2013.01); *B29B 7/90* (2013.01); *B29C 39/12* (2013.01); *B43K 5/005* (2013.01); *B29K 2063/00* (2013.01); *B29K 2067/00* (2013.01); *B29K 2075/00* (2013.01); *B29K 2105/162* (2013.01); *B29K 2507/045* (2013.01); *B29K 2509/08* (2013.01); *B29K 2509/10* (2013.01); *B29K 2995/002* (2013.01); *B29L 2031/7252* (2013.01)

(58) Field of Classification Search
CPC ... B29K 2509/10; B43K 5/005; B43K 21/006
See application file for complete search history.

(56) References Cited

U.S. PATENT DOCUMENTS

| | | | | |
|---|---|---|---|---|
| 2,524,812 A | * | 10/1950 | Lipke ................... | B43K 15/00 |
| | | | | 106/193.1 |
| 6,521,692 B1 | * | 2/2003 | Ozu ..................... | C08K 3/40 |
| | | | | 401/209 |
| 2002/0098029 A1 | * | 7/2002 | Beck ................... | B43K 23/008 |
| | | | | 401/6 |

OTHER PUBLICATIONS

"Diamond Dust." Amazon, Amazon, Sep. 10, 2017, www.amazon.ca/Glittery-Glitter-Diamond-Stuart-Semple/dp/B07583ZWMR. (Year: 2017).*

(Continued)

*Primary Examiner* — Seyed Masoud Malekzadeh
*Assistant Examiner* — Andres E. Behrens, Jr.
(74) *Attorney, Agent, or Firm* — Russell D. Nugent; The Humphries Law Firm. P.C.

(57) ABSTRACT

A novel method for making decorative structures, specifically for use as writing instruments composed of a novel material composition that scatters and reflects light to exhibit a particular visual effect, i.e. a glitter effect. The composition is made of one or a combination of a number of different resins combined with a mica dust and/or a diamond dust. The resin is an organic compound and in composed partially or entirely from epoxide, polyester and/or polyurethane. Other additives can be added to the resin to enhance the visual effect including ground glass and dyes or pigments.

14 Claims, 5 Drawing Sheets

(51) Int. Cl.
    *B29K 507/04*     (2006.01)
    *B29K 509/08*     (2006.01)
    *B29K 509/10*     (2006.01)
    *B29L 31/00*     (2006.01)

(56) References Cited

OTHER PUBLICATIONS

Abtec Inc. "Injection Molding Material Selection Guide." Abtec Inc., Jun. 25, 2018, web.archive.org/web/20180625185420/https://www.abtecinc.com/custom-plastic-injection-molding/materials. (Year: 2018).*

"DiamondCast® Round Blanks." McKenzie Penworks, www.mckenziepenworks.com/collections/diamond-cast-round-blank. Mar. 1, 2018 (Year: 2018).*

Rolls-Royce Paints Car With Diamonds. Mar. 8, 2017, www.tradearabia.com/news/LIFE_321698.html. (Year: 2017).*

* cited by examiner

METHOD OF MAKING PEN BODY RESIN RODS

CROSS-REFERENCE TO RELATED APPLICATIONS

This application claims the benefit of priority to U.S. Provisional Application No. 62/720,174 filed on Aug. 21, 2018. The content of U.S. Provisional Application No. 62/720,174 filed on Aug. 21, 2018 is incorporated by reference in its entirety.

BACKGROUND OF THE INVENTION

(a) Field of the Invention

The present invention is in the technical field of chemical compositions. More particularly, the present invention is a novel method that produces resinous structures intended to be machined into objects such as pen bodies and other objects meant to be machined on a lathe demonstrating a specific visual effect. Moreover, the disclosed method produces a liquid resin crystal material used for making blanks intended to be machined for further use into as items such as pen bodies and whose properties are a function of the chemical structure of the crystal component(s) in the resinous composition.

(b) Background Art

Pen making or "pen turning" has been around for at least 20 years but has become increasingly popular in recent years. This popularity is in part a result of the availability of a variety of kits that provide the materials and tools needed to make writing instruments including pens.

A number of hobbyists turn to resinous materials such as acrylic, polyethylene or epoxide based resins to form the body of the writing instrument. Kits are commonly sold with the resinous material being formed from two liquid solutions. Typically, there is a first resin solution that is meant to be mixed with a separate catalyst or curing agent, present in a separate solution, that causes the liquid resin to solidify into a hardened structure when added to the first material and allowed to set. While it is possible to cast the resin body in a tube shape with a void, space or lumen running the longitudinal length of the body, typically hobbyists will machine or drill a hole through the center of the body to allow for the insertion of the other components of the writing utensil.

There is no end to the number of different materials are commonly used to create pen bodies including metals like gold, steel and titanium, a variety of wood species, and organic material such as acrylic. Hobbyists achieve striking visual effects by purchasing pen bodies to which dyes and other materials have been introduced.

Currently, there are a number of materials that can be added to the material making up the pen body that can produce a sparkling or glitter effect. Specifically, glitter, which is typically made of copolymer plastics, aluminum foil as well as titanium dioxide, and iron oxides, can be added to the pen body during its formation to produce such an effect.

However, the inventor has discovered that a combination of mica dust and diamond dust produces a much more brilliant sparkle effect. Normally, a skilled artisan would not have an incentive to choose such an expensive material as diamond dust to make writing instruments. In addition, those in the industry generally avoid using hard or abrasive additives to avoid damaging the tools used to drill or machine the void that runs through the body of the instrument. That consideration in addition to cost makes using certain materials like diamond dust impractical. However, the inventor has solved these problems by formulating a dust made of mica and diamonds reduced to a certain size to achieve a superior visual effect and to avoid damaging the tools used to machine the resin body.

BRIEF SUMMARY OF THE INVENTION

The present invention is a novel method for making decorative rods composed of a novel material composition. More specifically, the inventor has discovered a new way of making resin rods, such as those that are used in the manufacture of pens and other writing instruments, which exhibit a particular visual effect. In preferred embodiments, the method produces a solid cylindrical structure having the desired visual attributes. Some embodiments produce hollow tubular or cylindrical structures that can house the inner workings of a writing instrument, such as an ink pen, but preferred embodiments and the anticipated best mode include the step of machining out the interior of the resin body to make the product.

More specifically, the chemical composition of the resin rods produced by the inventive method exhibit a sparkling or glitter-like visual effect when struck by visible light. The method involves the use of material made of one or a combination of a number of different resins combined with a mica dust and/or a diamond dust. The cylindrical structure referred to above includes an outer cylindrical body with an inner space or lumen running the entire longitudinal length of the cylindrical body. As mentioned earlier, the addition of diamond dust greatly enhances the reflective properties of the material in which it is suspended, i.e., the resin body. This is likely because individual diamonds have numerous flat surfaces called facets. Each diamond is therefore capable of reflecting light in a number of different directions; each diamond particle has more of these reflective surfaces than the traditional materials that are used to make glitter compounds.

The term "mica" refers to a number of naturally occurring mineral silicates (compounds containing both silicon and oxygen) that exhibit nearly perfect basal cleavage. Mica forms a layered scale-like structure and/or a crystalline structure. These structures cause mica to commonly appear as a stack of sheets of rocks. Mica has a number of industrial uses including use as an insulator. In addition, ground mica is used in the painting industry to stabilize and brighten pigments, facilitate suspensions, reduce chalking, stabilize the paint film and increase the resistance of the paint to water and weather. The particulates making up the mica dust used in the disclosed method are preferably as small as 1 micrometer and as large as 1000 micrometers (1 millimeter) in diameter. The size of these particulates is important to the method in that the inventor has found that decreasing the size of the diamond dust particulates and/or mixing them with mica dust particulates in the same size range enhances the visual effect produced by the end product, but the particulate size is also small enough not to interfere with or damage the tools used to further reshape the resin body.

Diamonds are a crystalline form of carbon. As mentioned above, diamonds have a number of flat surfaces called facets that are capable of reflecting light. The process of cutting rough diamonds produces fine particles of diamond or diamond dust. As with the mica dust, the inventor's preferred embodiments of the inventive method utilize diamond dust particles that are as small as 1 micrometer and as large as 1000 micrometers (1 millimeter) in diameter.

Preferred embodiments of the inventive method produce a polymer-based structure within which one or more types of dust is suspended. As discussed above, it is the suspended dust that produces the desired visual effect. In preferred embodiments, the dust is a combination of diamond dust and mica dust. As discussed above, the resin is typically a polymer structure that may be transparent or partially transparent. The resin is often made from two liquid solutions. The first solution generally contains the composition that forms the base of the resin and the second solution generally contains a curing agent or catalyst that facilitates the curing or hardening of the compound. The discussion of a two part liquid resin solution is illustrative of how hardened resins are typically produced and are not meant to limit the disclosure in any way. Any materials capable of forming a hardened resin based structure can be used with the disclosed method. The resin is typically an organic compound and in preferred embodiments is composed partially or entirely from epoxide, polyester and/or polyurethane. The inventor's anticipated best mode of the method involves the use of a polyurethane-based resin.

BRIEF DESCRIPTION OF THE SEVERAL VIEWS OF THE DRAWING(S)

DETAILED DESCRIPTION OF THE INVENTION

The method of making resin rods produces a material composition with specific properties, namely, the property of reflecting light from a number of discrete points. Preferred embodiments of the inventive method produce a tubular structure using the specified material composition.

Figure 1A:
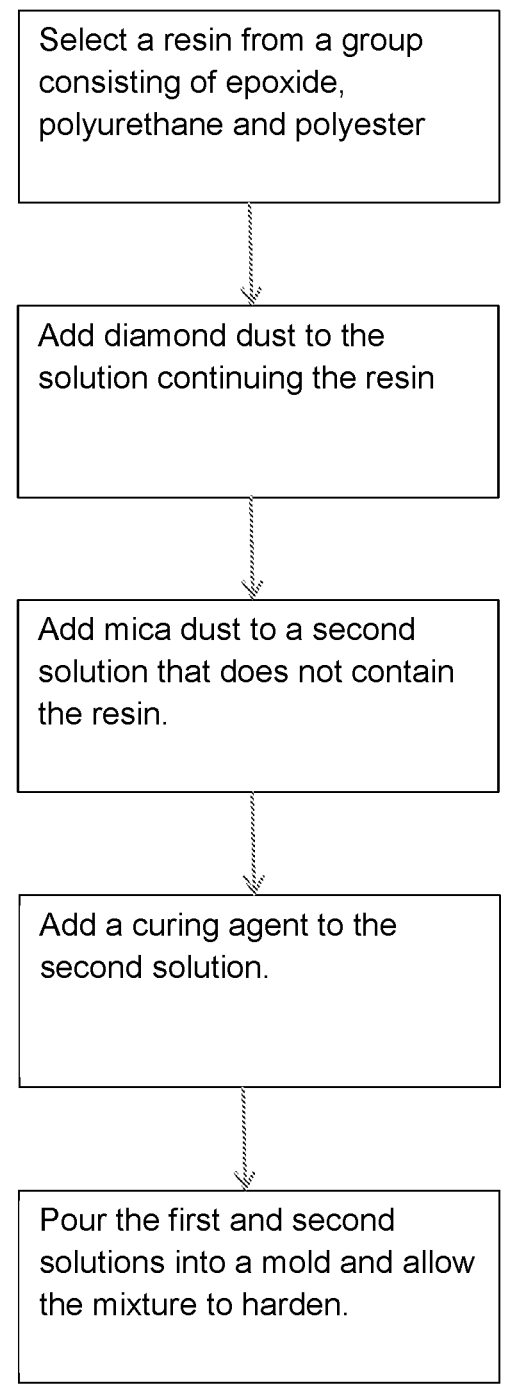
FIG. 1A is a flow chart showing a preferred embodiment of the present invention.

Referring in more detail to the flow chart in FIG. 1A, preferred embodiments and the anticipated best mode of the method begins with the selection of a suitable resin. In preferred embodiments and the anticipated best mode of the method, the resin is selected from a group of possible resins, including, but not limited to epoxide, polyurethane and polyester. In the anticipated best mode of practicing this method, a resin with a polyurethane base is used. As discussed above, the inventor anticipates that any resin or resin-like material can be used to form the base of the solution used to make the resin. Once the resin has been selected a curing agent must also be selected to mix with the resin.

Next dust is prepared and suspended in the resin solution (hereinafter referred to as the first solution) in the desired proportions. As discussed above, the preferred embodiments of the inventor's method uses a combination of mica dust and diamond dust suspended in the resin to create the desired visual effect. However, the inventor also anticipates embodiments that do not use mica dust and/or may also use dyes or paint additives to produces different visual effects. For example, some preferred embodiments include the use of pearlescent paint additives to impart a mother-of-pearl look to the product. The inventor also anticipates using other additives with the diamond dust, such as ground glass. In addition, the proportions of the dust components can be varied—some embodiments will have equal proportions of diamond dust and mica dust and some will not depending on the visual effect that is desired.

Referring back to the flow chart in FIG. 1A, once the dust has been mixed with the first solution, the curing agent or second resin solution is added to the first resin solution and the mixture is poured into a mold to shape the combined solution prior to its curing or hardening. At that point, a bore will be drilled through the resin body forming a lumen or space into which the components of a writing utensil can be inserted.

Figure 1B:
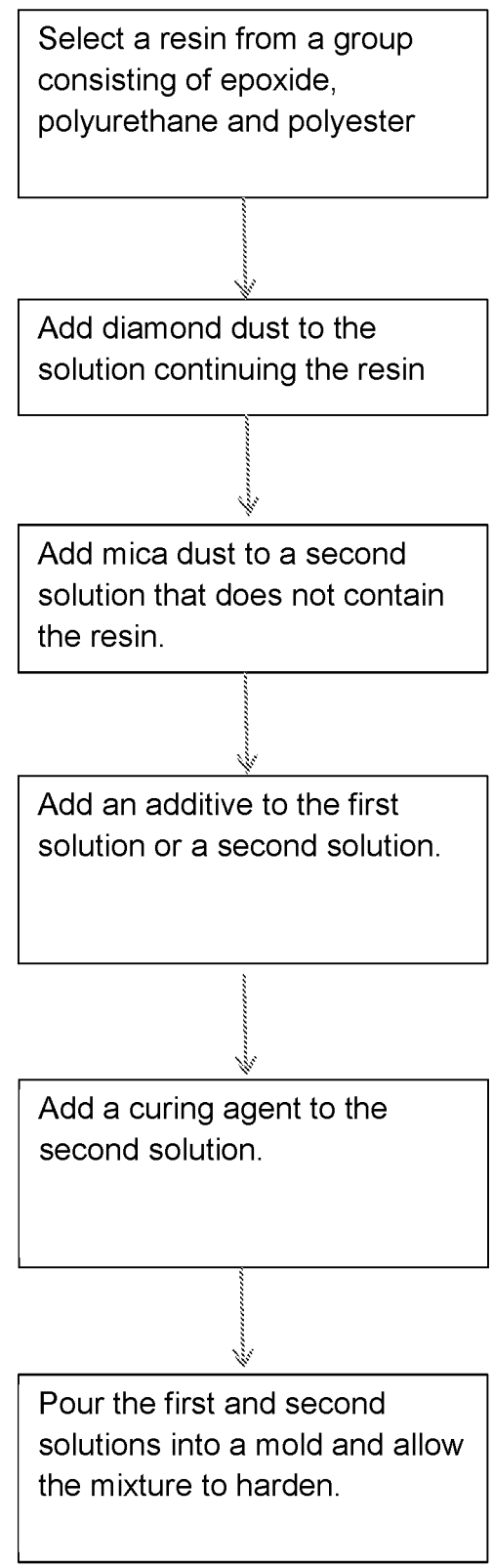
FIG. 1B is a flow chart showing an additional embodiment of the invention.

FIG. 1B is another flow chart showing an alternate embodiment of the same method. As before, the method begins with the selection of a suitable resin or resin-like substrate in which to suspend the dust. Next the dust, consisting of diamond dust and mica dust, is introduced into the liquid resin solution. Further, in these embodiments a dye or other paint additive is added to the liquid resin solution prior to the addition of the curing agent or second liquid resin solution. The additive may be a colored dye, pearlescent paint or some other traditional paint additive, or less traditional paint additives such as glass flakes. Once the additive is suspended in the first liquid resin solution, the curing agent is added and the combined solution is poured into a mold, if desired. In theory, the additives and dust could be added to the second liquid resin solution containing the curing agent, but doing so does not provide any specific advantage.

Figure 2:
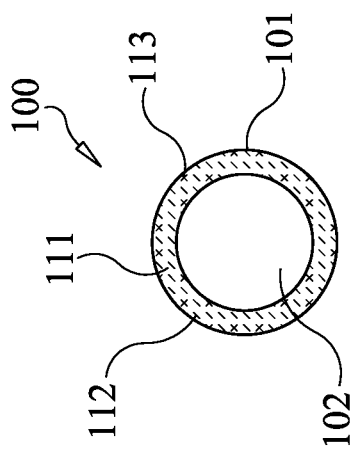
FIG. 2 is a top plan view of a pen resin body made by a preferred embodiment of the present invention.

FIG. 2 shows a pen body 100 that has been formed using the inventive method and then machined. Specifically, FIG. 2 shows the pen body 100 as a hardened circular (cylindrical) structure made of a material composition 101 that reflects light. In addition, FIG. 2 shows the lumen 102 or space that runs the longitudinal length of the pen body 100. The composition 101 is a resinous composition 111 mixed with dust with the desired substances suspended within. As discussed above, in preferred embodiments and the anticipated best mode of the inventive method, the dust consists of two separate substances, specifically, mica dust 112 and diamond dust 113. FIG. 2 shows mica dust 112 and diamond dust 113 suspended within the resin 111. Each of the particles of mica dust 112 forms a crystal that reflects light. Similarly, the diamond dust particles 113 have a plurality of facets that also reflect light. The combination of these two substances suspended in the resin 111 produces a glitter or sparkling effect.

Figure 3:
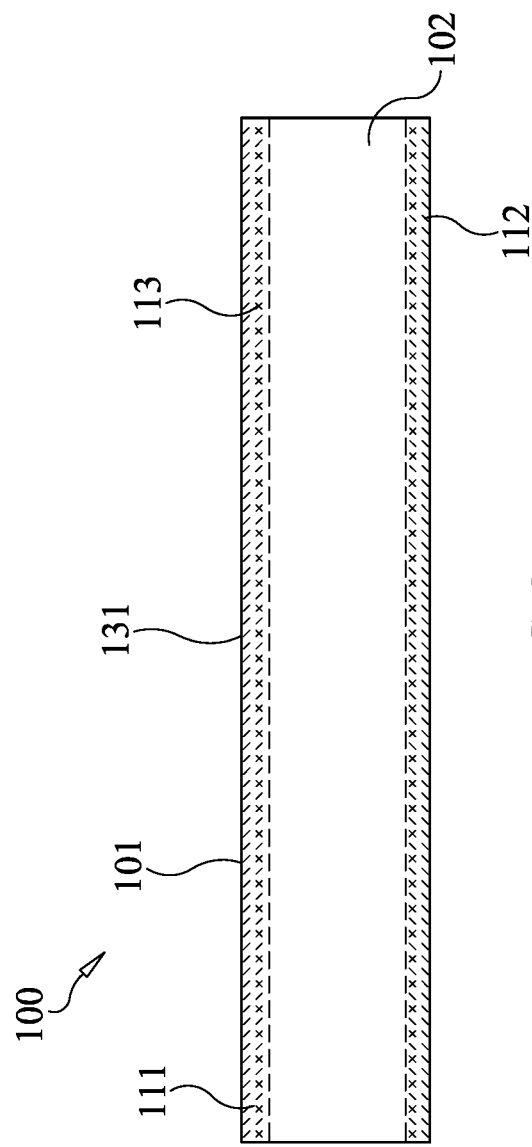
FIG. 3 is a side cross-sectional view of a pen resin body made by the present invention.

FIG. 3 also shows the pen body 100 made from a resin 111 with dust particles suspended therein. FIG. 3 shows a longitudinal cross section of the pen body 100. As discussed above, the inventor anticipates some embodiments may also contain other additives such as ground glass, a colored dye and/or paint additives. FIG. 3 shows the resin body 111 with a lumen 102 or space running the longitudinal length of the pen body 100 and surrounded by an outer cylinder 131 made of the hardened resin 111. The lumen 102 shape and orientation is dictated by the shape and orientation of the pen body 100 and need not be restricted to any particular size or shape.

Figure 4:
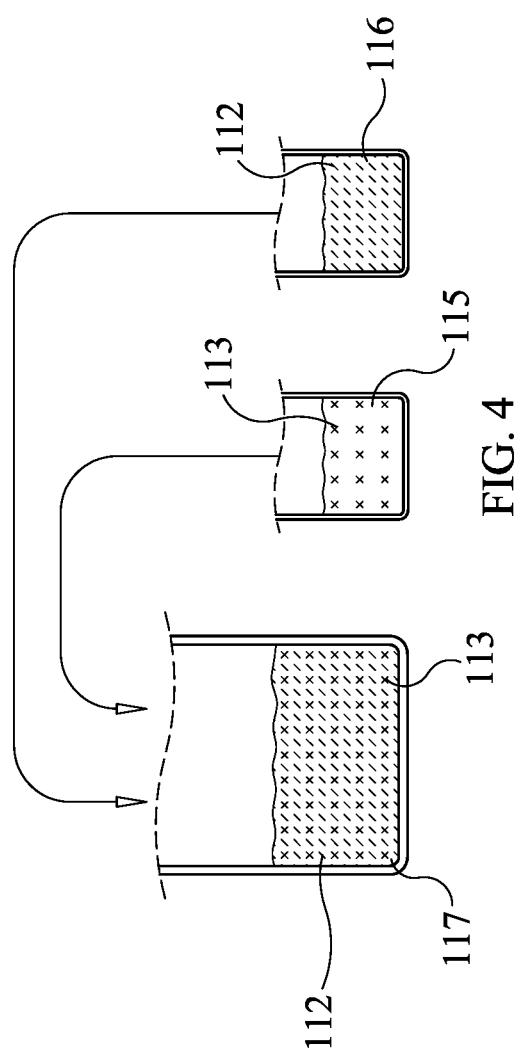
FIG. 4 is a side cross-sectional view of the solutions used as part of the present invention.
Figure 5:
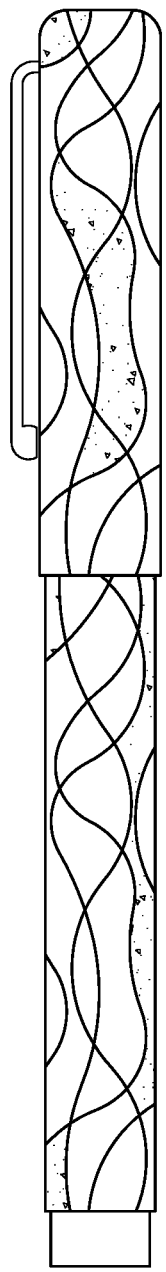
FIG. 5 is a side plan view of a pen body made by the disclosed method.

FIG. 4 is a graphic illustration of the flow charts in FIGS. 1A and 1B. FIG. 4 shows the first liquid resin solution 115 and the second solution 116 containing a curing agent. FIG. 4 also shows a mold 117 into which the solutions are poured. A skilled artisan can appreciate that the solutions 115 and 116 could be mixed then poured into a mold 117 or they can be mixed as they are poured into the mold 117. In the anticipated best mode of this method, mica dust 112 and diamond dust 113 are mixed into the first resin solution 115 and second resin solution 116, respectively, then poured into the mold 117 with the curing agent in the second solution 116. The resulting composition 101 is then allowed to set, cure or harden in the mold 117 after which, the pen body 100 is ready to be removed from the mold 117 to be made into a fully functioning writing instrument (See FIG. 5).

Figure 6:
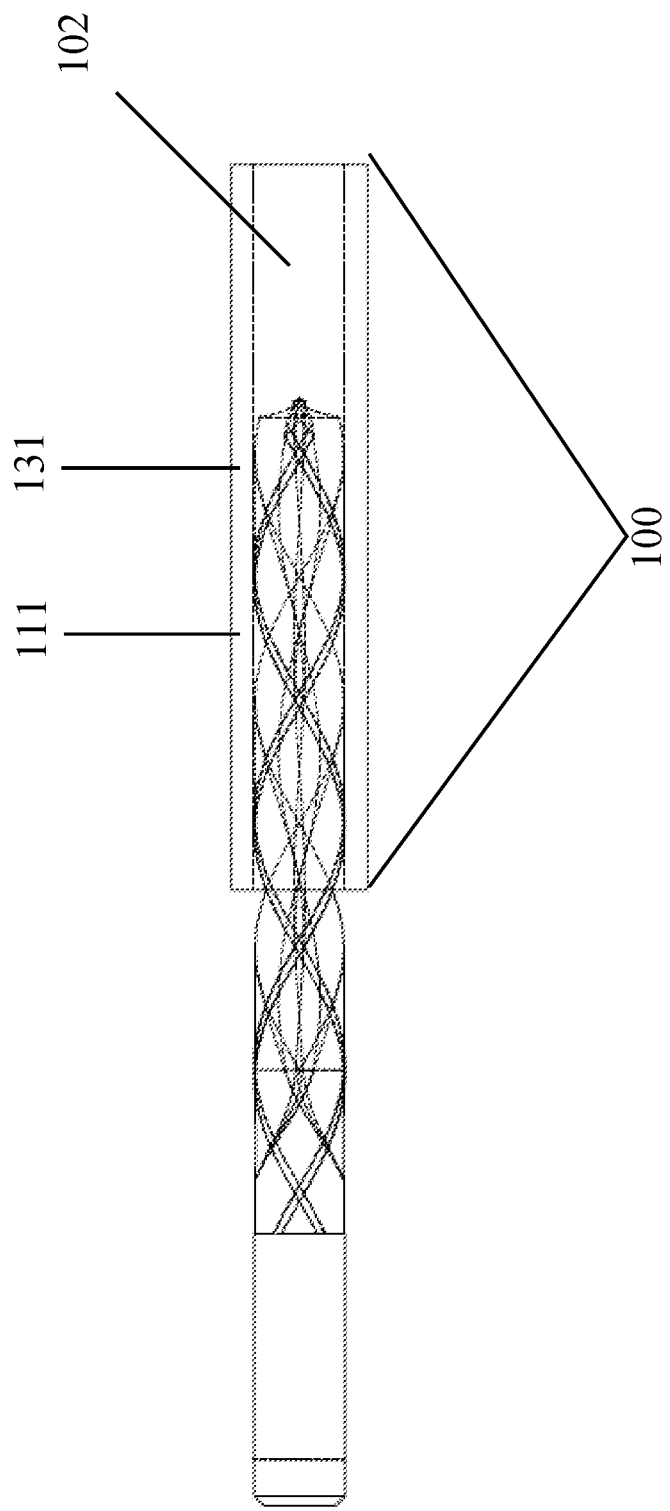
FIG. 6 is a cross-sectional view of the step of drilling a bore through the center of a hardened structure made by the inventive method.

In addition, the lumen or space that is produced by preferred embodiments can be produced by pouring the liquid resin into a mold prior to its setting and/or the lumen can be drilled into a hardened structure. As discussed above, the preferred embodiments and the anticipated best mode of the method involve drilling the lumen into the resin body after it has been allowed to harden. FIG. 6 shows the step of a bore or lumen 102 being drilled into the resin pen body 100 forming a lumen 102 or space running the longitudinal length of the pen body 100 and surrounded by an outer cylinder 131 made of the hardened resin 111.

A skilled artisan will appreciate that the resin rod itself can be made in any number of shapes and still produce the desired visual effect. The hollow cylindrical structure is typical for writing instruments and is referred to throughout this specification for convenience only. The inventive method need not be used to produce a pen body at all, but rather could be used to produce any durable structure capable of being made with resinous compounds, in whatever shape is desired.

The advantages of the present invention include, without limitation, the ability to produce a hardened structure, possibly for use in a writing instrument, that produces a brilliant glitter or sparkle effect. The disclosed method allows for customization of such an object, through the addition of various additives including mica dust, dyes, paints and ground glass. The method is easy to use and cab be replicated with very little expense or equipment.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method of making decorative rods producing a glitter effect comprising:
    selecting a liquid resin; mixing diamond dust into the resin forming a first solution; mixing a curing agent into a second solution; pouring the first solution and the second solution into a mold and waiting for it to harden or cure and drilling a bore through a center of the hardened structure, wherein the diamond dust is made of particles that range in size from 501 to 1000 micrometers and the mica dust is made of particles that range in size from 501 to 1000 micrometers.

2. The method of claim 1 further comprising the step of mixing mica dust into the first or second solution.

3. The method of claim 2 further comprising the step of mixing a dye into the first solution or the second solution prior to pouring the first and second suspension into the mold.

4. The method of claim 1 wherein the liquid resin is a polymer.

5. The method of claim 3 wherein the liquid resin is a polymer.

6. The method of claim 2 wherein the resin is made from a polymer.

7. The method of claim 3 wherein the liquid resin is a polymer.

8. A method of making a decorative resin body comprising: selecting a liquid resin made from a polymer; adding diamond dust made of particles that range in size from 1 to 1000 micrometers in diameter to the liquid resin forming a first solution; adding mica dust made of particles that range in size from 1 to 1000 micrometers in diameter to a second solution; adding a curing agent to the second solution; and pouring the first solution and the second solution into a mold and waiting for it to harden or cure and drilling a bore through a center of the hardened structure.

9. The method of claim 8 further comprising the step of mixing an additive into the first or second solution prior to pouring the solutions into the mold.

10. The method of claim 9 wherein the additive is selected from a group consisting of ground glass, paint or a dye.

11. A decorative pen body made according to the method of claim 8.

12. A method of making a decorative pen body comprising:
    selecting a liquid resin;

adding diamond dust made of particles that range in size from 1 to 1000 micrometers in diameter to the liquid resin forming a first solution;

adding mica dust made of particles that range in size from 1 to 1000 micrometers in diameter to a second solution;

adding a curing agent to the second solution;

pouring the first solution and the second solution into a mold and waiting for it to harden or cure into a hardened structure; and drilling a bore through a center of the hardened structure.

13. The method of claim 12 wherein the resin is a polymer.

14. The method of claim 12 further comprising the step of mixing an additive into the first or second solution prior to pouring the solutions into the mold wherein the additive is selected from a group consisting of ground glass, paint or a dye.

\* \* \* \* \*